United States Patent

Chung et al.

Patent Number: 5,597,490
Date of Patent: Jan. 28, 1997

[54] DADMAC/VINYL TRIALKOXYSILANE COPOLYMERS FOR TREATMENT OF FOOD PROCESSING WASTES

[75] Inventors: Daniel K. Chung, Burlington, Canada; Manian Ramesh, Lisle, Ill.

[73] Assignee: Nalco Chemical Company, Naperville, Ill.

[21] Appl. No.: 521,938

[22] Filed: Aug. 31, 1995

[51] Int. Cl.$^6$ .......... C02F 1/56
[52] U.S. Cl. .......... 210/727; 210/734; 210/735; 210/905
[58] Field of Search .......... 210/702, 708, 210/725, 727, 728, 734, 905, 735

[56] References Cited

U.S. PATENT DOCUMENTS

| | | | |
|---|---|---|---|
| 3,409,547 | 11/1968 | Dajani et al. | 210/735 |
| 3,624,019 | 12/1971 | Anderson et al. | 260/29.6 H |
| 4,151,202 | 4/1979 | Hunter et al. | 526/310 |
| 4,396,513 | 8/1983 | Haldeman et al. | 210/734 |
| 4,734,205 | 3/1988 | Jacques et al. | 210/708 |
| 4,801,388 | 1/1989 | Fong et al. | 210/701 |
| 4,835,234 | 5/1989 | Valint et al. | 526/258 |
| 4,869,829 | 9/1989 | Casey | 210/706 |
| 4,929,655 | 5/1990 | Takeda et al. | 524/458 |
| 5,006,590 | 4/1991 | Takeda et al. | 524/458 |
| 5,120,797 | 6/1992 | Fong et al. | 525/329.4 |
| 5,429,749 | 7/1995 | Chung et al. | 210/734 |
| 5,451,326 | 9/1995 | Carlson et al. | 210/708 |
| 5,476,522 | 12/1995 | Kerr et al. | 210/734 |

*Primary Examiner*—Peter A. Hruskoci
*Attorney, Agent, or Firm*—Robert A. Miller; James J. Drake; Patricia A. Charlier

[57] ABSTRACT

The present invention relates generally to the treatment of food processing wastes. More particularly, the present invention provides a chemical treatment method that effectively removes fat, blood, tissue and other solids from food processing waste, using novel hydrophobically associating copolymer compositions. These polyelectrolyte compositions are water soluble silicon containing copolymers prepared from dialkyldiallyl ammonium halides, particularly diallyldimethyl ammonium chloride (DADMAC) and vinyl alkoxysilanes, preferably vinyltrimethoxysilane (VTMS).

9 Claims, No Drawings

DADMAC/VINYL TRIALKOXYSILANE COPOLYMERS FOR TREATMENT OF FOOD PROCESSING WASTES

BACKGROUND OF THE INVENTION

1. Field of the Invention

The present invention relates generally to the treatment of food processing wastes. More particularly, the present invention provides a chemical treatment method that effectively removes fat, blood, tissue and other solids from food processing waste, using novel silicon containing copolymer compositions. These polyelectrolyte compositions are silicon containing copolymers of diallyldimethyl ammonium halides, particularly diallyldimethyl ammonium chloride (DADMAC) and vinyl alkoxysilanes, preferably vinyltrimethoxysilane (VTMS).

2. Description of the Prior Art

Everyday the food processing industry produces many tons of food processing waste. Such food processing waste contaminates the water stream flowing through the food processing system. For example, poultry farm waste water effluents are enriched with fat, oil, blood and other solids from the poultry process. These by-products, such as fat, blood, and tissue, are typically present in the waste water in a range of several hundred to tens of thousands of ppm.

For economic as well as regulatory reasons, the food processing community faces never-ending concerns regarding the disposal and recycling of food processing waste water. The removal of such by-products is critical from an environmental standpoint. In fact, the United States Environmental Protection Agency has placed tight restrictions on total oil and solids content in water that is to be discharged into public drinking water supplies or into open bodies of water.

The removal of such solids is also critical to the established discharge limits for total dissolved solids (TDS), chemical oxygen demand (COD), biological oxygen demand (BOD) and total organic carbon (TOC) into local sewers and rivers. In addition to the EPA's severe discharge limits, food processing industries must also be concerned with local city ordinances.

As an alternative to discharging treated water into a water stream or the like, recycling of the waste back into the processing system provides a cost efficient system. However, in order to recycle such waste water, the solids content and so forth must be effectively removed in order to provide pure water back into the system. Accordingly, the same concerns that are present with respect to the removal of such solids for EPA standards exist for recycling purposes as well.

One of the most effective methods of removing fat, blood, tissue and other solids in waste waters is through the use of chemical aids. Historically, dry polymers and inverse emulsion latexes have been used to treat food processing water. Each material has its own advantages and disadvantages. While dry polymers have the benefit of being extremely concentrated, thereby reducing shipping costs, the equipment to dissolve the polymers is expensive and is not available to all end-users on site. Dry polymers also have a large extent of cross-linking; thus, insoluble, gel materials are present.

Latex polymers also suffer from problems but are used quite frequently. Latex polymer preparations include 30–35% solids dispersed in oil. The latex polymer must be also inverted prior to use. Numerous problems associated with this feeding method have caused many customers to avoid latex polymers. In addition, the latexes generally have a very narrow treating range, often resulting in over-treatment at higher dosages.

Chemicals such as polyethylene oxide, polyethylene amine, polydiallyldimethylammonium chloride and copolymers of acrylamide and quaternized acrylates are specific types of chemical treatments that have been used in the food processing industry. Poly(DADMAC) used to clarify water is disclosed in U.S. Pat. No. 3,409,547. DADMAC/acrylamide copolymers for use in water clarification have been disclosed in U.S. Pat. Nos. 4,869,829; 4,396,513; 4,734,205; and 4,835,234. Hydrophobically modified DADMAC copolymers for the conditioning of food processing waste water have been disclosed in U.S. Pat. No. 5,429,749.

While these chemical treatments have provided a means for removing food, blood, oil and other solids from the waste water, disadvantages exist with the use of such chemical treatments. For example, the above polymers have been traditionally synthesized in an oil solvent, thereby producing an environmentally unfriendly treatment program as well as presenting a potential fire hazard. In addition, chemical treatments incorporating the above polymers contain surfactants. Still further, these prior chemical treatments have a high toxicity thereby preventing the use of such treated waters for recycling purposes or for public drinking water supplies.

Therefore, a need exists for a treatment system that addresses all the environmental concerns presented by food processing waste, while at the same time being environmentally friendly.

SUMMARY OF THE INVENTION

The present invention relates generally to the treatment of food processing wastes. More particularly, the present invention provides a chemical treatment method that effectively removes fat, blood, tissue and other solids from food processing waste, using novel silicon containing copolymer compositions. These silicon containing polyelectrolyte compositions are copolymers of diallyldimethyl ammonium halides, particularly diallyldimethyl ammonium chloride (DADMAC) and vinyl alkoxysilanes, preferably vinyltrimethoxysilane (VTMS).

DESCRIPTION OF THE INVENTION

A method for conditioning food processing waste water prior to chemical dewatering comprising the step of treating the food processing waste water with an effective amount of at least one silicon containing polymer coagulant of diallyldimethyl ammonium halide and a vinyl alkoxysilane.

The food processing waste waters are preferably treated with coagulants and optionally with flocculants. It has been discovered that surface charge neutralization of colloidal particles in the mineral slurries can be enhanced by the use of a copolymer which has been modified to incorporate silicon moities. Such a modification can be accomplished by copolymerizing a diallyldimethylammonium halide, particularly diallyldimethylammonium chloride (DADMAC) with vinyl alkoxysilane, preferably vinyl trimethoxysilane.

The vinyl alkoxysilane monomers useful in the copolymer composition of the invention contain an alkyl group of from 1–4 carbon atoms. As such vinyl trimethoxy, triethoxy, tripropoxy and tributoxysilanes, and combinations thereof, may find use in the subject invention. While vinyl trialkoxysilane s are preferred, the monomers may be mono or di-substituted as well, or mixtures of mono-, di- and trialkoxy substituted silanes may be used. A preferred vinyl trialkoxysilane for use in this invention is vinyl trimethoxysilane, commercially available from Hills America, Piscataway, N.J.

Diallyldimethylammonium halides, especially diallyldimethylammonium chloride (DADMAC) are well-known and commercially available from a variety of sources. One method for the preparation of DADMAC is detailed in U.S. Pat. No. 4,151,202, the disclosure of which is hereinafter incorporated by reference into this specification.

The mole ratio of DADMAC to the vinyl trialkoxysilane ranges from 99.99:0.01 to 80:20 and, preferably from 99.9:0.1 to 85:15. Most preferably, the mole ratio of DADMAC to the vinyl trialkoxysilane range from 99.9:0.1 to 95.0:5.0.

The polymers may be prepared as in conventional vinyl polymerization techniques. These techniques include conventional solution polymerization in water, and polymerization in water-in-oil emulsion form, such as that described in U.S. Pat. No. 3,624,019, the disclosure of which is hereinafter incorporated by reference into this specification. The polymers of the invention may also be prepared in so-called dispersion form, such as that described in U.S. Pat. Nos. 4,929,655 and 5,006,590 the disclosures of which is also hereinafter incorporated by reference into this specification. The polymers of the instant invention may be in solid, dispersion, latex or solution form.

Conventional free radical catalysis may be used, including both free radical initiators such as azo derivatives, or persulfates and redox systems. Such polymerizations are within the purview of those skilled in the art and as such will not be elaborated on in this specification.

The molecular weights of the copolymer prepared hereunder can vary greatly. Generally, copolymers of diallyldimethylammonium chloride and vinyl trimethoxysilane produced hereunder will have a molecular weight of from 50,000 to 5,000,000, and preferably 75,000 to 2,500,000, and most preferably from 100,000 to 1,500,000. The polymers of this invention will accordingly have a reduced specific viscosity for a one percent actives polymer solution as measured in one molar sodium nitrate of from 0.2–8 dl/gm and preferably from 0.5–5.0 dl/gm. A most preferred reduced specific viscosity range is from 0.7–3.0 dl/gm. While discussed herein as copolymers of diallyldimethylammonium halides and vinyl alkoxysilanes, other monomers may be incorporated into the resultant polymers without detracting from the spirit and intent of the invention. Possible monomers that may be incorporated include, but are not limited to nonionic and cationic vinyl monomers. These materials are exemplified by acrylamide, and such cationic monomers as dimethylaminoethylmethacrylate and dimethylaminoethyl acrylate and their respective water soluble quaternary ammonium salts.

The method of claim 2 including the further step of adding a flocculant to the treated food processing waste water.

The copolymers of this invention may be used alone, or in combination with a high molecular weight anionic or non-ionic or amphoteric water soluble or dispersible flocculant. Such polymers include polyacrylamide, copolymers of acrylamide with acrylic acid and its water soluble alkali metal or ammonium salts and terpolymers of acrylamide, acrylic acid, and a cationic monomer such as DMAEA.MCQ. As used herein, the term acrylic acid is meant to encompass such water soluble salts. Also useful are such polymers as sulfo-methylated acrylamides as exemplified in U.S. Pat. Nos. 5,120,797 and 4,801,388, the disclosures of which are hereinafter incorporated by reference into this specification. Other commercially available anionic flocculant materials may also be utilized.

A preferred class of flocculants for use in this invention includes copolymers of acrylamide and acrylic acid having a mole ratio of acrylamide to acrylic acid of from 99:1 to 1:99 and preferably 99:1 to 50:50. Most preferably, the mole ratio of acrylamide to acrylic acid will be 95:5 to 60:40. An especially preferred flocculant for use in this invention has a mole ratio of acrylamide to acrylic acid of about 70:30.

The flocculants of this invention may be prepared in solution form, or in water-in-oil emulsion form. The preparation of such flocculants is known to those skilled in the art. The flocculants generally have molecular weights ranging from as low as 1,000,000 to 20,000,000 or higher. Preferred flocculants have a molecular weight of about 10,000,000. The upper weight of molecular weight is not critical so long as the polymer is water soluble or dispersible.

The flocculant which may be used in this program may be anionic, non-ionic cationic or amphoteric. Anionic flocculants are exemplified by AcAm/sodium or ammonium (meth)acrylate copolymers, poly (sodium or ammonium (meth)acrylate), AcAm/sodium AMPS copolymers, homo or copolymers of vinylsulfonic acid, homo or copolymers of maleic acid. Non-ionic flocculants include, poly(meth)acrylamide, polyethylene oxide, clays, bentonite. Cationic flocculants include homo or copolymers of DMAEA or DMAEM quats with AcAm.

In an embodiment, the method of the present invention includes the further step of adding an effective amount of a precipitant to the food processing waste. The precipitant component of the present invention facilitates the removal of unwanted chemicals within the final effluent. Naturally, the particular type of precipitant chosen depends on the particular constituent that is to be removed from the food processing waste.

Pursuant to the method of the present invention, food processing waste can be purified and an environmentally friendly water is simultaneously obtained. In an embodiment, the method of the present invention involves the addition of at least one hydrophobically modified polymer flocculant to the food processing waste. While the sole addition of the hydrophobically modified polymer flocculant effectively conditions the food processing waste prior to mechanical dewatering, the combined addition of a coagulant and precipitant provides a complete chemical treatment method.

The optimal amounts of the various components required for effectiveness in this invention depend on the type of food processing waste being treated. In addition, the concentration of the combined components varies greatly and can depend upon the conditions such as temperature and pH of the food processing waste.

According to the method, the silicon containing polymers of the present invention are added to a food processing waste water stream. In an embodiment, the polymers are added in an effective amount of from 1 to 500 ppm. In a more preferred embodiment, the polymers are added in an effective amount of from 5 to 200 ppm. In the most preferred embodiment, the polymers are added in an amount of from 20 to 100 ppm.

The silicon containing coagulants of the present invention can be applied to food processing waste slurry, stored or screened solids, or to filtrate produced by dewatering. In an embodiment, the coagulant, followed by a flocculant, is directly injected into the food processing waste. The coagulant may be added with or without a dilution system. The polymers of the invention are preferably added to the system in neat form. However, in some applications, the polymers can be added as an aqueous solution. The active polymer bridges suspended solids leading to optimal dewatering of solids as well as optimal clarification of filtrate liquors.

Once the polymers of the invention are added to the waste water stream, the treated water is naturally agitated as it moves through the process stream of the food processing plant. The polymers of the invention will cause the fat, blood, tissue and the like to separate from the water and float to the surface of the water as a floc. The floc is subsequently removed from the surface of the water and handled further. The treated water can now be discharged either into a river, lake or recycled into an industrial process.

For a complete chemical treatment system, a second coagulant and a precipitant may also be added to the food processing waste water. In an embodiment, the second coagulant component of the present invention is added in an effective amount of from 0.01 to 2 ppm. Whereas, in an embodiment, the precipitant component of the present invention is added in an effective amount of from 5 to 100 ppm. The second coagulant portion of the present invention is preferably applied to the filtrate produced by dewatering of the food processing waste slurry, or to food processing waste. The precipitant portion of the present invention is preferably applied neat direct to the filtrate or food processing waste. The precipitants not only facilitate the removal of unwanted chemicals but also allow optimal coagulation and settlement of solids.

Examples of suitable second coagulants that may be used in the present invention include: ferric sulfate, ferrous sulfate, aluminum sulfate, aluminum chloride, polyaluminum chloride, ferrous chloride, ferric chloride, aluminum chlorohydrate, colloidal silica, ethylene-dichloride/ammonia polymers, melamine/formaldehyde polymers, and epichlorohydrin-dimethylamine condensation polymer in liquid form; polydiallyldimethyl ammonium chloride in liquid or solid form; and mixtures thereof.

The following examples are presented to describe preferred embodiments and utilities of the invention and are not meant to limit the invention unless otherwise stated in the claims appended hereto.

EXAMPLE 1

A 90:10 mole copolymer of diallyldimethylammonium chloride (DADMAC) and vinyl trimethoxysilane (VTMS), at 20% actives, was prepared for use as a coagulant. The following reactants were used to form the silicon containing polyelectrolyte copolymer coagulant:

| | | |
|---|---|---|
| 312.91 | grams | Diallyldimethylammonium Chloride DADMAC (a 58% Solution) |
| 18.89 | grams | Vinyl Trimethoxysilane (a 98% Solution) |
| 200.0 | grams | Deionized Water |
| 1.80 | grams | [2,2'-Azobis (2-amidinopropane)] Dihydrochloride Initiator |
| 20.0 | grams | Sodium Chloride |
| 446.20 | | Final Solution Water |
| 0.1 | grams | Versene |

A semi-batch process was used to prepare the DADMAC/VTMS copolymer.

A 1.5L reactor equipped with a mechanical stirrer a thermocouple, nitrogen inlet/outlet tubes, condenser and two syringe pumps was set up. Vinyltrimethoxysilane was taken in the first pump set at a delivery rate of 4.5 cc/hr. The second pump contained an aqueous solution of 2,2' azobis (2-amidinopropane) dihydrochloride (1.2 g in 48.8 g DI water), and the pump was set at 12.5 cc/hr.

The DADMAC, sodium chloride, and Versene were charged into a polymerization reactor and heated to 52° C. The reaction mixture was purged with nitrogen. VTMS and initiator-containing pumps were started and the polymerization was allowed to proceed.

A thick polymer started forming after about 2 hours. At the end of two and a half hours, the viscosity increased to a point where continued agitation was difficult. 200 ml of deionized water was then added. The reaction continued for a period of 5 hours, and then subjected to a post treatment at 82° C. for 5 hours.

Product phase separated in two days and indicated extensive crosslinking as shown below:

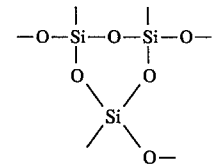

The phase-separated product swelled in water, yet was water-insoluble.

EXAMPLE 2

A 99.5/0.5 mole ratio copolymer of diallyldimethylammonium chloride (DADMAC) and vinyl trimethoxysilane (VTMS), at 20% actives, was prepared for use as a coagulant. The following reactants were used to form the silicon containing polyelectrolyte copolymer coagulant:

| | | |
|---|---|---|
| 321.13 | grams | DADMAC (a 62% Solution) |
| 1.00 | grams | VTMS (a 98% Solution) |
| 0.2 | grams | Versene |
| 258.8 | grams | Deionized Water |
| 1.20 | grams | 2,2'-Azobis [2(2-imdazolin-2yl) propane Dihydrochloride Initiator |
| 61.00 | grams | Sodium Chloride |
| 356.87 | grams | Dilution Water |

A batch process was used to prepare the DADMAC/VTMS copolymer. A reactor similar to the one described in Example 1 was used.

The DADMAC, VTMS, Versene, sodium chloride and deionized water were charged into a polymerization reactor at a temperature of 58° C. Thereafter, the initiator (0.6 grams in 49.4 grams deionized water) was charged into the reactor dropwise via a syringe pump at 12.5 cc/hour.

A thick polymer started forming after about 1.0 hour. At the end of 1.5 hours, the mixture was difficult to stir. At this point, deionized water addition was started using a syringe pump set at 70 ml/hour. The reaction continued for a period of 5.5 hours. After that, initiator (0.6 grams in 19.4 grams of deionized water) was added. The reactor was heated to 82° C. and held at that temperature for 3 hours. The reaction product was then diluted with 356.87 grams of water and stored. Reduced specific viscosity and intrinsic viscosity measurements were determined on a 1% polymer solution in $NaNO_3$ (sodium nitrate) and found to be 2.02/1.3 dl/gm respectively.

EXAMPLE 3

A 99.0/1.0 mole ratio DADMAC/VTMS copolymer was prepared using the procedure of Example 2. 2.0 g of VTMS and 355.07 g of DI water were used in place of the amounts in Example II. All other quantities were the same. RSV/IV for a 1% by weight solution of the polymer in sodium nitrate were 2.2/1.2 dl/g, respectively.

EXAMPLE 4

The copolymers to be tested were dissolved in water. This aqueous solution was then stirred for 30 minutes. A 1% solution of a flocculant (AcAm/sodium acrylamide copolymer) was prepared.

In a 800 ml beaker, 500 ml of food processing waste water from a chicken processing plant was treated with the copolymer solution as prepared above and mixed for 60 seconds. The flocculant (an acrylamide/sodium acrylate copolymer) was then added and the mixing continued for another 60 seconds. Agitation was then stopped and the solution was allowed to stand for 60 seconds. The supernatent liquid was separated and its turbidity measured using a HACH® DR2000 turbidimeter.

The results are enumerated in Table 1. Dosages of the polymers are listed on an actives basis. The treatment of the instant invention works better than conventional treatments as represented by polymers A, E and F demonstrated as a reduction in turbidity by a decrease in NTU value.

TABLE 1

| Polymer Treatment | Dosage (ppm) | Clarity (NTU) |
|---|---|---|
| Blank | None | >1000 |
| E/F | 80/10 | 135 |
| E/F | 60/10 | 1000 |
| E/F | 40/10 | >1000 |
| B/C | 15/3 | 234 |
| A/B/C | 2/15/3 | 56 |
| D/B/C | 2/15/3 | 38 |
| A/B/C | 4/15/3 | 38 |
| D/B/C | 4/15/3 | 16 |
| A/B/C | 6/15/3 | 32 |
| D/B/C | 6/15/3 | 18 |
| A/B/C | 8/15/3 | 25 |
| A/B/C | 10/15/3 | 22 |

A: Commercial Poly(Diallyldimethyl Ammonium Chloride), IV = 0.8–1.2 dL/g
B: Poly(Acrylamide/Acrylic Acid/Dimethylaminoethyl Methyl Chloride Quaternary) (40/10/50 mole %)
C: Poly(Acrylamide/Sodium Acrylate) (70/30 mole %)
D: Poly(Diallyldimethyl Ammonium Chloride/Vinyltrimethoxysilane) (99/1 mole %), IV = 0.8 dL/g, Polymer synthesized according to procedure of Example 3
E: Poly(Acrylamide/Dimethylaminoethyl Methyl Chloride Quaternary) (60/40 mole %, DRY)
F: Poly(Acrylamide/Sodium Acrylate) (70/30 mole %, DRY)

EXAMPLE 5

The procedure described in Example 4 was utilized to obtain the results of Table 2. The data demonstrates that polymers of the instant invention are effective for turbidity reduction in food processing waste water.

TABLE 2

| Coagulant | Coagulant IV (dL/g) | Coagulant Dose (ppm) | Flocculant | Flocculant Dose (ppm) | Clarity (NTU) |
|---|---|---|---|---|---|
| Blank | none | none | none | none | >1000 |
| p(DADMAC) | 0.8–1.2 | 15 | AcAm/NaAc[2] | 15 | 766 |
| DADMAC-BCQ[1] | 1.6 | 15 | AcAm/NaAc[2] | 15 | 406 |
| DADMAC/VTMS[3] | 1.23 | 15 | AcAm/NaAc[2] | 15 | 398 |
| p(DADMAC) | 0.8–1.2 | 20 | AcAm/NaAc[2] | 15 | 707 |
| DADMAC-BCQ[1] | 1.6 | 20 | AcAm/NaAc[2] | 15 | 244 |
| DADMAC/VTMS[3] | 1.23 | 20 | AcAm/NaAc[2] | 15 | 172 |
| p(DADMAC) | 0.8–1.2 | 15 | AcAm/NaAc[2] | 20 | 647 |
| DADMAC-BCQ[1] | 1.6 | 15 | AcAm/NaAc[2] | 20 | 349 |
| DADMAC/VTMS[3] | 1.23 | 15 | AcAm/NaAc[2] | 20 | 347 |
| p(DADMAC) | 0.8–1.2 | 10 | AcAm/NaAc[2] | 20 | 563 |
| DADMAC-BCQ[1] | 1.6 | 10 | AcAm/NaAc[2] | 20 | 372 |
| DADMAC/VTMS (99/1) | 1.23 | 10 | AcAm/NaAc[2] | 20 | 380 |
| Polymer E[4] | | 100 | AcAm/NaAc[2] | 20 | 437 |

[1]Poly(Diallyldimethyl Ammonium Chloride/Dimethylaminoethyl Benzyl Chloride Quat) 90/10 mole %
[2]AcAm/NaAc = Poly(Acrylamide/Sodium Acrylate) 70/30 mole %

TABLE 2-continued

| Coagulant | Coagulant IV (dL/g) | Coagulant Dose (ppm) | Flocculant | Flocculant Dose (ppm) | Clarity (NTU) |
|---|---|---|---|---|---|

[3]Poly(Diallyldimethyl Ammonium Chloride/Vinyltrimethoxysilane) (99/1 mole %), IV = 0.8 dL/g, Polymer synthesized according to procedure of Example 3
[4]Poly(Acrylamide/Dimethylaminoethyl Methyl Chloride Quaternary) (60/40 mole %), (DRY)

EXAMPLE 6

The procedure described in Example 4 was utilized to obtain the results of Table 3. The copolymers of the instant invention show enhanced activity over the conventional poly(DADMAC) treatments.

TABLE 3

| Coagulant | Coagulant IV (dL/g) | Coagulant dose (ppm) | Flocculant | Flocculant Dose (ppm) | Clarity (NTU) |
|---|---|---|---|---|---|
| Blank | none | none | none | none | >1000 |
| p(DADMAC)[1] | 0.8–1.2 | 36 | AcAm/NaAc[2] | 55 | 509 |
| p(DADMAC)[1] | 1.8 | 36 | AcAm/NaAc[2] | 55 | 964 |
| DADMAC/VTMS[3] | 1.2 | 36 | AcAm/NaAc[2] | 55 | 445 |
| DADMAC/VTMS[4] | 1.23 | 36 | AcAm/NaAc[2] | 55 | 310 |
| p(DADMAC)[1] | 0.8–1.2 | 40 | AcAm/NaAc[2] | 55 | 309 |
| p(DADMAC)[1] | 1.8 | 40 | AcAm/NaAc[2] | 55 | 788 |
| DADMAC/VTMS[3] | 1.2 | 40 | AcAm/NaAc[2] | 55 | 216 |
| DADMAC/VTMS[4] | 1.23 | 40 | AcAm/NaAc[2] | 55 | 123 |
| p(DADMAC)[1] | 0.8–1.2 | 48 | AcAm/NaAc[2] | 55 | 149 |
| p(DADMAC)[1] | 1.8 | 48 | AcAm/NaAc[2] | 55 | 492 |
| DADMAC/VTMS[3] | 1.2 | 48 | AcAm/NaAc[2] | 55 | 74.7 |
| DADMAC/VTMS[4] | 1.23 | 48 | AcAm/NaAc[2] | 55 | 56.8 |
| p(DADMAC)[1] | 0.8–1.2 | 40 | AcAm/NaAc[2] | 50 | 136 |
| DADMAC/VTMS[3] | 1.2 | 40 | AcAm/NaAc[2] | 50 | 58.4 |
| DADMAC/VTMS[4] | 1.23 | 40 | AcAm/NaAc[2] | 50 | 41.8 |
| p(DADMAC)[1] | 0.8–1.2 | 40 | AcAm/NaAc[2] | 45 | 107 |
| DADMAC/VTMS[3] | 1.2 | 40 | AcAm/NaAc[2] | 45 | 47.2 |
| DADMAC/VTMS[4] | 1.23 | 40 | AcAm/NaAc[2] | 45 | 38 |
| p(DADMAC)[1] | 0.8–1.2 | 40 | AcAm/NaAc[2] | 40 | 148 |
| DADMAC/VTMS[3] | 1.2 | 40 | AcAm/NaAc[2] | 40 | 78.1 |
| DADMAC/VTMS[4] | 1.23 | 40 | AcAm/NaAc[2] | 40 | 58.6 |
| Polymer E[5] |  | 200 | AcAm/NaAc[2] | 40 | 437 |

[1]Commercial Poly(Diallyldimethyl Ammonium Chloride), IV = 0.8–1.2 dL/g
[2]AcAm/NaAc = Poly(Acrylamide/Sodium Acrylate) 70/30 mole %
[3]Poly(Diallyldimethyl Ammonium Chloride/Vinyltrimethoxysilane) (99.5/0.5 mole %). Polymer synthesized according to the procedure of Example 2.
[4]Poly(Diallyldimethyl Ammonium Chloride/Vinyltrimethoxysilane) (99/1 mole %), IV = 0.8 dL/g, Polymer synthesized according to procedure of Example 3
[5]Poly(Acrylamide/Dimethylaminoethyl Methyl Chloride Quaternary) (60/40 mole %, DRY)

Changes can be made in the composition, operation and arrangement of the method of the present invention described herein without departing from the concept and scope of the invention as defined in the following claims:

We claim:

1. A method for conditioning food processing waste water prior to chemical dewatering comprising the steps of:
   a) treating the food processing waste water containing fat, blood and tissue with an effective coagulating amount of a water soluble silicone containing polymer coagulant prepared from a diallyldimethyl ammonium halide and a vinyl alkoxysilane wherein the coagulant has a reduced specific viscosity in one molar sodium nitrate solution for one percent polymer actives from 0.2 to 8 dl/gm and the mole ratio of diallyldimethyl ammonium chloride to vinyl alkoxysilane ranges from 99.9:0.1 to 80:20;
   b) allowing a floc of fat, blood and tissue to separate from said waste water; and
   c) removing the floc from the treated water.

2. The method of claim 1 wherein the diallyldimethyl ammonium halide is diallyldimethyl ammonium chloride and the vinyl alkoxysilane is vinyl trimethoxysilane.

3. The method of claim 2 wherein the coagulant has a reduced specific viscosity in one molar sodium nitrate solution for one percent polymer actives from 0.5 to 5.0 dl/gm.

4. The method of claim 2 wherein the coagulant has a reduced specific viscosity in one molar sodium nitrate solution for one percent polymer actives from 0.7 to 3.0 dl/gm.

5. The method of claim 2 wherein the mole ratio of diallyldimethyl ammonium chloride to vinyl trimethoxysilane ranges from 99.9:0.1 to 85:15.

6. The method of claim 2 including the further step of adding a flocculant to the treated food processing waste water.

7. The method of claim 2 wherein the food processing waste is treated with from about 1 to about 500 parts per million of the water soluble silicon containing polymer coagulant.

8. The method of claim 2 wherein the food processing waste water is treated with from about 10 to about 300 parts per million of the water soluble silicon containing coagulant.

9. The method of claim 2 wherein the food processing waste water is treated with from about 20 to about 100 parts per million of the water soluble silicon containing polymer coagulant.

* * * * *